(12) United States Patent
Mandel et al.

(10) Patent No.: US 8,336,425 B2
(45) Date of Patent: Dec. 25, 2012

(54) CONNECTING ROD WITH CAST-IN INSERT

(75) Inventors: Joel H. Mandel, Hartford, WI (US);
Donald D. Cooper, Fond du Lac, WI (US); Carl J. Langraff, Waukesha, WI (US)

(73) Assignee: GKN Sinter Metals, LLC, Auburn Hills, MI (US)

( * ) Notice: Subject to any disclaimer, the term of this patent is extended or adjusted under 35 U.S.C. 154(b) by 1052 days.

(21) Appl. No.: 11/995,770

(22) PCT Filed: Jul. 19, 2006

(86) PCT No.: PCT/US2006/027913
§ 371 (c)(1),
(2), (4) Date: Jun. 11, 2008

(87) PCT Pub. No.: WO2007/015879
PCT Pub. Date: Feb. 8, 2007

(65) Prior Publication Data
US 2008/0264378 A1 Oct. 30, 2008

Related U.S. Application Data

(60) Provisional application No. 60/701,153, filed on Jul. 21, 2005.

(51) Int. Cl.
*F16C 7/00* (2006.01)
*B21D 53/84* (2006.01)
*B23P 17/00* (2006.01)

(52) U.S. Cl. ............... 74/579 E; 74/579 R; 29/888.09; 123/197.3

(58) Field of Classification Search ............... 74/579 E, 74/579 R; 164/98; 29/527.5, 505, 96.5, 29/888.09; 92/239; 384/430, 270; 403/162; B22D 17/24, 19/00
See application file for complete search history.

(56) References Cited

U.S. PATENT DOCUMENTS 1,130,982 A * 3/1915 Kinkead ................. 384/270
1,434,143 A * 10/1922 Patterson et al. ......... 403/162
(Continued)

FOREIGN PATENT DOCUMENTS
DE   32 41 141 A1 * 6/1984
(Continued)

OTHER PUBLICATIONS

Machine Translation of JP 6-154999, Yoshiharu et al., Jun. 3, 1994.*
(Continued)

*Primary Examiner* — Vinh T. Luong
(74) *Attorney, Agent, or Firm* — Quarles & Brady LLP

(57) ABSTRACT

A cast metal connecting rod of the type used in a reciprocating piston engine has a beam section between two end sections. The beam section and the end sections are integral with one another and are at least partially made of a cast metal material. At least the beam section of the connecting rod includes an insert made of a sintered powder metal material. The insert is at least partially encapsulated by the cast metal material of the connecting rod. The insert reinforces the connecting rod and can help match characteristics of surrounding or mating parts of the engine that are made of materials more similar to the material of the insert than the cast metal of the connecting rod. The cast metal material, for example aluminum alloy, of the connecting rod can also provide localized regions of high machinability where needed.

18 Claims, 4 Drawing Sheets

U.S. PATENT DOCUMENTS

| | | | | |
|---|---|---|---|---|
| 2,428,602 | A * | 10/1947 | Yingling | 74/579 E |
| 3,390,925 | A * | 7/1968 | Fangman | 384/430 |
| 4,191,238 | A | 3/1980 | Pichl | |
| 4,334,507 | A | 6/1982 | Kohnert et al. | |
| 4,691,590 | A * | 9/1987 | Geringer et al. | 74/579 E |
| 4,836,044 | A * | 6/1989 | Lobig | 74/579 E |
| 4,841,801 | A | 6/1989 | Tice | |
| 5,131,577 | A * | 7/1992 | Hoag et al. | 225/96.5 |
| 5,660,156 | A | 8/1997 | Whitacre et al. | |
| 5,673,666 | A | 10/1997 | Beardmore et al. | |
| 6,371,009 | B1 * | 4/2002 | Cobble | 92/239 |
| 6,854,357 | B2 * | 2/2005 | Jager et al. | 74/579 E |
| 7,625,522 | B2 | 12/2009 | Cooper | |
| 2002/0170161 | A1 * | 11/2002 | Cadle et al. | 29/505 |
| 2007/0261514 | A1 * | 11/2007 | Geiman et al. | 74/579 R |

FOREIGN PATENT DOCUMENTS

| | | | | |
|---|---|---|---|---|
| DE | 39 39 261 A1 * | 5/1991 | | 29/527.5 |
| JP | 2-84243 * | 3/1990 | | 164/98 |
| JP | 6-154999 * | 6/1994 | | |
| WO | 2004112996 A1 | 12/2004 | | |

OTHER PUBLICATIONS

PTO Dec. 1529, English Translation of JP 2-84243, Yasuo, Mar. 26, 1990.*

Translation of DE 3939261.*

International Search Report and Written Opinion under date of mailing of Feb. 9, 2007 corresponding to PCT/US2006/027913.

* cited by examiner

CONNECTING ROD WITH CAST-IN INSERT

CROSS REFERENCE TO RELATED APPLICATIONS

This application represents the national stage application of International Application PCT/US2006/027913, filed Jul. 19, 2006, which claims the benefit of U.S. Provisional Patent Application 60/701,153, filed Jul. 21, 2005, which is incorporated herein by reference in its entirety for all purposes.

STATEMENT CONCERNING FEDERALLY SPONSORED RESEARCH OR DEVELOPMENT

Not applicable.

BACKGROUND OF THE INVENTION

1. Field of the Invention

This invention relates to connecting rods, for example of the type used in reciprocating piston engines, and in particular to cast connecting rods.

2. Discussion of the Related Art

Connecting rods used in reciprocating piston and internal combustion engines have great stresses imposed upon them in operation of the engine and therefore must be very strong, and preferably of light weight. In the case of connecting rods, the ends of the connecting rod must be machined for the bearing bores, one for the crank pin and the other for the wrist pin, and also typically the crank end of the connecting rod also must be drilled and tapped so as to secure the crankshaft bearing cap of the connecting rod to the remainder of the connecting rod.

Forming the connecting rod with traditional materials that possess the required combination of strength and weight can result in difficult machining of the connecting rod, and in particular in increased wear and tear on the tools and tooling used in the machining operations. Hence, the typical solution in prior art connecting rods was to compromise strength and weight for machinability.

For smaller engines, the material of the connecting rod may be a cast aluminum alloy. Such material is machinable, but can be marginal for strength, and also may have a significantly different coefficient of thermal expansion than the crankshaft or the wrist pin.

Thus, a need exists for a connecting rod construction that is machinable, strong, lightweight and thermally compatible with the crankshaft and wrist pin materials, and economical to manufacture.

SUMMARY OF THE INVENTION

The invention provides a cast metal connecting rod having a powder metal insert. The insert reinforces the connecting rod and can help match characteristics of surrounding or mating parts of the engine that are made of materials more similar to the material of the insert than the cast metal of the connecting rod.

The cast metal material, for example aluminum alloy, of the connecting rod can also provide localized regions of high machinability where needed. As used herein, machinability refers to the relative ease of machining a metal, and various machinability indexes are well known that provide a relative measure of the machinability of an engineering material under specified standard conditions. The insert, which is placed in the mold during the casting operation, is preferably enveloped and at least partially infiltrated by the aluminum alloy material. The insert, which is mechanically unified with the aluminum alloy in the finished connecting rod, increases the strength of the connecting rod and helps the connecting rod composite material match the material characteristics of the crankshaft and wrist pin, most notably the thermal expansion characteristics of the crankshaft and wrist pin.

A composite connecting rod of the invention, having a relatively high strength sintered powder metal insert permeated with cast aluminum, has the potential to increase the applicability of cast aluminum connecting rods to larger or higher performance engines. Previously, connecting rods of such engines were made of mainly ferrous materials, which are heavy and difficult to machine in comparison.

In one aspect, the invention provides a cast metal connecting rod that has a beam section between two end sections. The beam section and the end sections are integral with one another and are at least partially made of a cast metal material. At least the beam section of the connecting rod includes an insert made of a sintered powder metal material. The insert is at least partially encapsulated by the cast metal material of the connecting rod.

The cast metal material of the connecting rod may be a material that is more machinable than the sintered powder metal material of the insert. For example, the cast metal material can be an aluminum alloy and the sintered powder metal material of the insert may comprise mostly iron powder. The cast metal material may at least partially permeate pores of the insert. The insert may have a perforated beam section, and may have a finger that extends into one of the end sections of the connecting rod. Also, the insert may at least partially surround a hole in one of the end sections in the connecting rod. One of the end sections in the connecting rod may be dimensioned to be secured to a piston of an engine, and the insert may have a widened section at the end section that is dimensioned to be secured to the piston. One of the end sections in the connecting rod may be dimensioned to be secured to a crankshaft of an engine, and the insert may have a widened section at the end section that is dimensioned to be secured to the crankshaft.

In another aspect, the invention provides a method for forming a cast connecting rod having a beam section between two end sections wherein the beam section and the two end sections are integral with one another. In the method, a sintered powder metal insert is placed in a mold, and a metal material is introduced into the mold such that at least the beam section of the cast connecting rod comprises the insert partially encapsulated by the cast metal material. The metal material may be a material that is more machinable than the sintered powder metal insert. For example, the metal material can be an aluminum alloy, and the sintered powder metal insert comprises a majority of iron. In the method, the sintered powder metal insert may be formed to include pores, and the cast metal material at least partially permeates the pores of the insert during casting. In the method, the insert may be formed to have a finger, and the insert is placed in the mold such that the finger extends into one of the end sections of the cast connecting rod. In the method, the insert may be placed in the mold such that the insert at least partially surrounds a hole in one of the end sections in the cast connecting rod.

Additional objects and advantages of the invention will be apparent from the detailed description and drawings.

BRIEF DESCRIPTION OF THE DRAWINGS

Like reference numerals will be used to refer to like parts from Figure to Figure in the following description of the drawings.

DETAILED DESCRIPTION OF THE PREFERRED EMBODIMENTS

Figure 1:
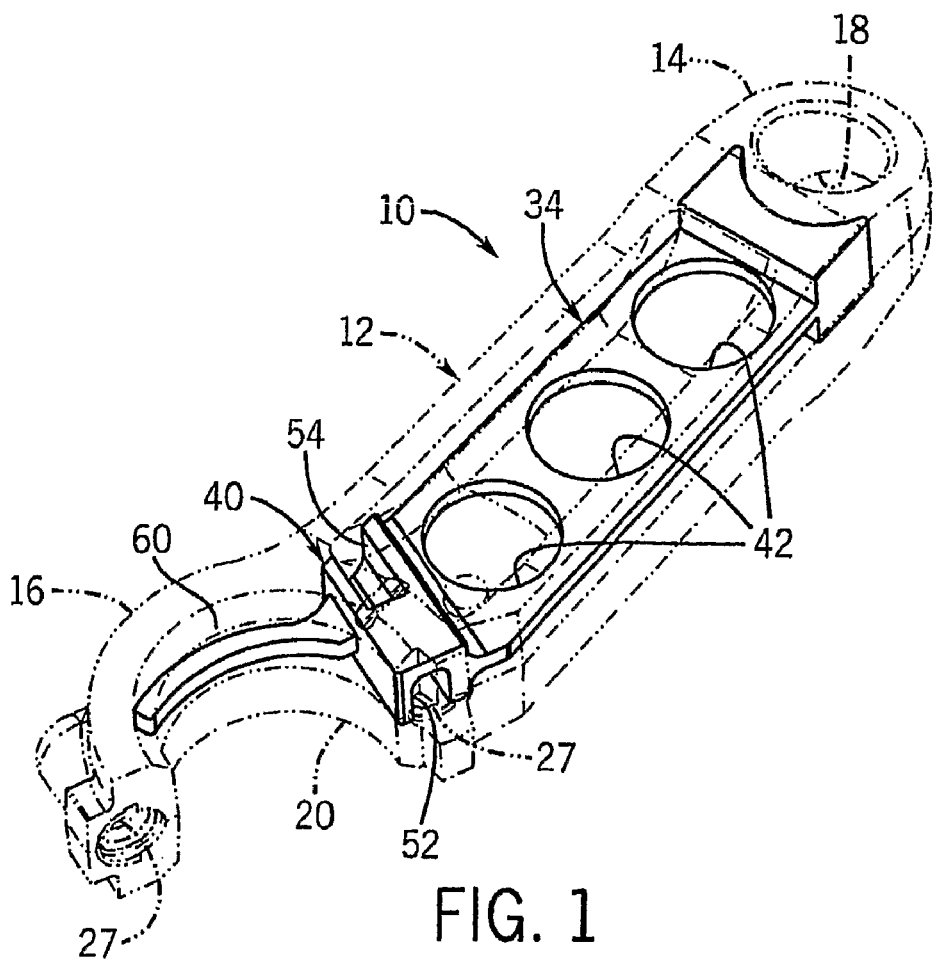
FIG. 1 is a solid model perspective view of a connecting rod that incorporates the invention, with the cast aluminum shown in light gray (except for the cast aluminum that permeates the insert) and the insert shown in dark gray.
Figure 2:
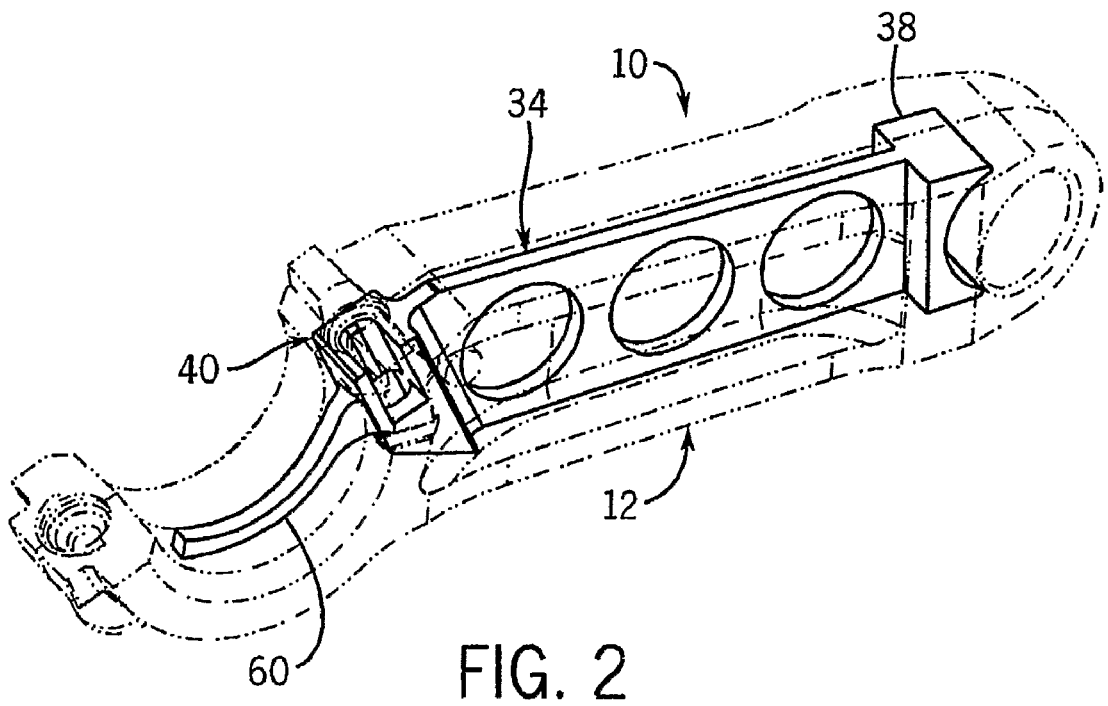
FIG. 2 is a perspective view of the connecting rod like FIG. 1 from a different angle.
Figure 3:
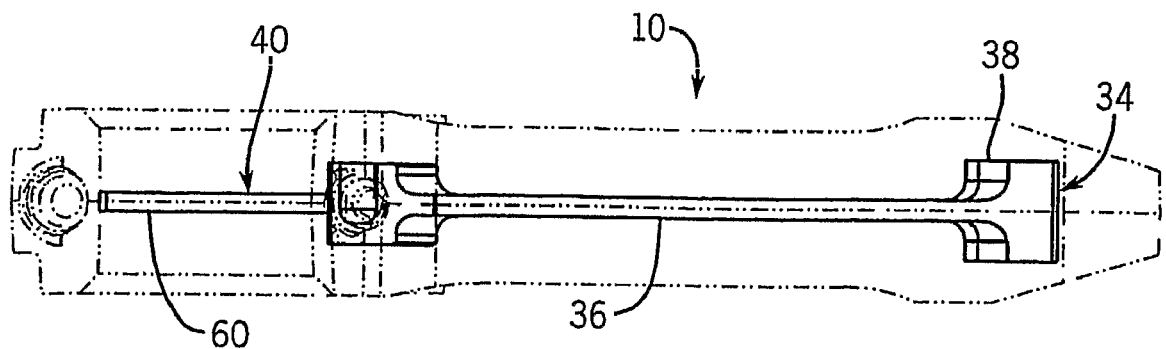
FIG. 3 is a side view of the connecting rod of FIG. 1.

Referring first to FIGS. 1-3, a connecting rod 10 of the invention has a central beam section 12 having at one end thereof an integrally connected piston end 14 and at the other end thereof an integrally connected crank end 16. The piston end 14 has a smaller bore 18 therethrough for receiving the wrist pin (and bearing if applicable) of a piston and the crank end 16 has a larger bore 20 at least partially defined thereby for receiving a journal of a crankshaft and a bearing. A bearing cap (not shown) that is bolted to the crank end 16 provides the other half of the bore 20. If the bore 20 was formed totally in the end 16, the end 16 could be provided with opposed notches at the sides of the bore 20 which concentrate the stress so that the crankshaft cap portion of the end 16 could be separated by fracture splitting from the remainder or base portion of the end 16, which creates an interface between the cap and the remainder of the connecting rod that allows refitting of the cap to the remainder with high positional accuracy. Bores 27, which may be threaded, are formed in the end 16 on opposite sides of the bore 20 so that bolts with or without nuts can be used to secure the bearing cap to the end 16.

In FIGS. 1-4, the lighter gray material may be a cast material, such as an aluminum alloy, and the darker gray material is an insert 34 that is made of a sintered powder metal material, for example a powder metal material largely comprising iron. The insert need not be subjected to any machining operations and so may be made of a relatively strong and hard material such as MPIF (Metal Powder Industries Federation) P/F 4660 Modified material. The constituents of MPIF P/F 4660 Modified are iron, nickel 1.75-2.00 wt. %, molybdenum 0.50-0.60 wt. %, manganese 0.10-0.25 wt. %, and carbon (as graphite approximately 0.60 wt. %). Thus, the MPIF P/F 4660 Modified typically has at least 95% iron. The hardness of MPIF P/F 4660 Modified in the finished part is approximately HRC 45 and the tensile strength of MPIF P/F 4660 Modified in the finished part is approximately 1650 MPa. The density of MPIF P/F 4660 Modified in the finished part is approximately 7.80 g/cc. If the insert 34 were to be subjected to machining operations, for example if holes were to be drilled in it or threads were to be cut in it, it could be made of MPIF P/F 11C60, which is a current connecting rod powder metal material that sintered powder metal connecting rods can be made of. MPIF P/F 11C60 includes iron, copper 1.8-2.2 wt. %, manganese sulfide 0.3-0.5 wt. %, manganese 0.10-0.25 wt. %, and carbon (as graphite approximately 0.60 wt. %), and the hardness in the finished part is approximately HRC 25, and the tensile strength is approximately 900 MPa. and the density is approximately 7.80 g/cc. Thus, the MPIF P/F 11C60 typically has at least 95% iron.

Most current connecting rods fail primarily in the beam section, and therefore the beam section is of increased strength. The two ends 14 and 16 need to be softer material to allow machining of the bores 18 and 20, and also for drilling and/or tapping of the crank end bolt holes 27.

Other materials could also be used for the insert. U.S. Pat. No. 5,501,529 describes a bearing support insert in which a sintered powder metal is cast into an aluminum alloy engine block and is permeated with the cast aluminum during the casting process. This patent and all other patents and publications referred to herein are hereby incorporated by reference.

The insert 34 may be made in a powder metal sintering process as follows. It may be desirable in the process of making the insert 34 to limit the particle size distribution range of the powder metal from which the insert 34 is made to a relatively narrow range so as to increase or maximize the permeability of the finished insert 34. To accomplish this, a powder material may be screened to the appropriate size range. For a coarse material, a size range of −30 mesh to +100 mesh (ASTM standard mesh size) is preferred. For a medium size range, it may be possible to use a size range of −100 mesh to +325 mesh, and for a fine material a size of −325 mesh may be used.

The screened material may be blended with 1-6% by weight of a non-metallic powder, for example, an organic stearate powder, which is a pore former and ejection lubricant that burns off in the sintering process. This blended material is then compacted into the desired shape of the insert (which may be any shape) at a relatively low pressure, for example 5-15 tons per square inch. Another option would involve a higher percentage of non-metallic powder compacted at a higher pressure. The compacted insert is then ejected from the mold. At this stage of the process, the insert is normally referred to as "green".

The green insert is then sintered by heating it in a protective atmosphere, as is well known in the art. Nominally, this may be done at a temperature of 2050° F. for 15 minutes. The sintered insert is then allowed to cool to room temperature. The finished insert 34 may have an open interconnected porosity randomly and homogeneously distributed throughout it of between 15-60%, as measured by ASTM (American Society for Testing and Materials) Standard No. B328. Whereas full density of the sintered material of the insert 34 may be typically 7.8 grams per cubic centimeter, a density of an insert 34 of the invention may optionally be approximately 5 grams per cubic centimeter. However, any percentage of open interconnected porosity sufficient for the molten aluminum alloy to permeate the insert 34 during the casting process is within the scope of the present invention. In addition, the invention may be incorporated into any suitable casting process, including sand mold, lost foam, die casting or other processes, and may be applied to gravity feed or low pressure casting processes, or any other casting process sufficient to permeate the material into the voids of the insert 34.

In the casting process, the insert 34 is placed in the mold for the rod 10, in the same manner that other types of inserts are known to be placed in casting molds, and the molten material is introduced to the mold. Since the insert 34 is permeable to the molten material, the molten material flows into the insert 34 to fill many if not most or all of the interconnected voids of the insert 34. When the molten material cools, the insert 34 is substantially more solid, being made of a metal matrix composite (MMC) of the material of the insert 34 and of the aluminum alloy material.

The insert 34 being made permeable to the molten material strengthens the insert 34 by the molten material filling the voids of the insert 34 and also creates mechanical interconnections between the insert 34 and the rod 10 which retain the insert 34 in the casting. In addition, the insert 34 imparts desirable machinability and thermal expansion properties to the rod 10.

FIGS. 5-9 illustrate the insert 34 alone, without the cast aluminum around and permeating it. It too has a beam section 36, a piston end 38 and a crankshaft end 40. The beam section has holes 42 formed in it which reduce material and weight without significantly adversely affecting strength. The beam section 36 is relatively thin, compared to the piston end section 38, as is the connecting rod 10, to fit within the envelope of the connecting rod 10 and be totally encapsulated by the aluminum alloy material, although being totally encapsulated is not absolutely necessary to practicing the invention. The end face 44 of end 38 is concave and spaced inwardly from bore 18, so there is a thickness of aluminum alloy material between the end face 44 and the bore 18. End 38 reinforces bore 18 and the shoulder between end 38 and beam 36 helps lock the insert relative to the aluminum alloy material longitudinally.

Likewise at the other end 40, a shoulder is created where a portion of end 40 is of increased width. End 40 is formed with two slots 52 and 54. The slots 52, 54 open to opposite sides of the end 40 and intersect in the middle of the end 40, where there is an absence of material where the slots intersect, to create a hole 56 extending through the end 40 with clearance to permit hole 27 to extend through it, with a thickness of aluminum alloy material between the hole 27 and the slots 52, 54. The disclosure of how to form such holes in powder metal compacts is contained in PCT International Patent Application Publication No. WO 2004/112996 A1. In the method of WO 2004/112996 A1, horizontal holes or slots can be created during the pressing cycle.

In particular, a powder compaction tooling die set is provided that includes a die, and upper and lower tooling members that may also be referred to as punches. The die and upper and lower tooling members are moved by mechanical, hydraulic or other means of power when installed in a powder metal compacting press. In a starting position, the die is aligned with the lower tooling members, and the lower tooling members all have their upper surfaces level with one another. In a second step, the lower tooling members move relative to one another to form a cavity that forms the lower and outside surfaces of the component. This may occur by moving the punches down and/or moving the die up. The upper and inside surfaces of the component are formed by the lower ends of the punches. In a third step, the resulting cavity is filled with powder metal. In a fourth step, the upper tooling members are moved into the die cavity to begin compacting the powder from the top side, at the same time the lower tooling members move relative to the die compacting the powder from the bottom side, or from a different perspective the punches are moving toward each other compacting the powder between them contained in the cavity by the die In a fifth step, the punches continue moving toward each other until an upper tooling member passes a lower tooling member. In a sixth step, the upper tooling members move upward relative to and away from the lower tooling members.

Referring still to FIGS. 5-9, end 40 includes a finger-like curved extension 60 that extends partially around bore 20 to reinforce the crankshaft end 16 of the connecting rod and help equalize the coefficient of thermal expansion of the bore 20 to the coefficient of thermal expansion of the crankshaft, which like the insert 34 would be made of a ferrous material. The extension 60 is concave in the direction toward the bore 20 to conform to the shape of the crankshaft end 16, and is small enough to be fully encapsulated by the cast aluminum material of the connecting rod 10.

Especially in the areas of the connecting rod 10 that are machined, e.g., the bores 18 and 20 and holes 27, there should be an adequate thickness of the cast material so that the cutting tools that perform the machining do not contact the insert 34, unless the insert 34 is made of a machinable powder metal material and it is intended to be machined.

As mentioned above, a bearing cap is bolted to the end 16 that completes the bore 20. The bearing cap could also be made of a cast aluminum material with a sintered powder metal insert cast into it like the insert described above. This would reinforce the bearing cap and help match the coefficient of thermal expansion of the crankshaft.

Figure 4:
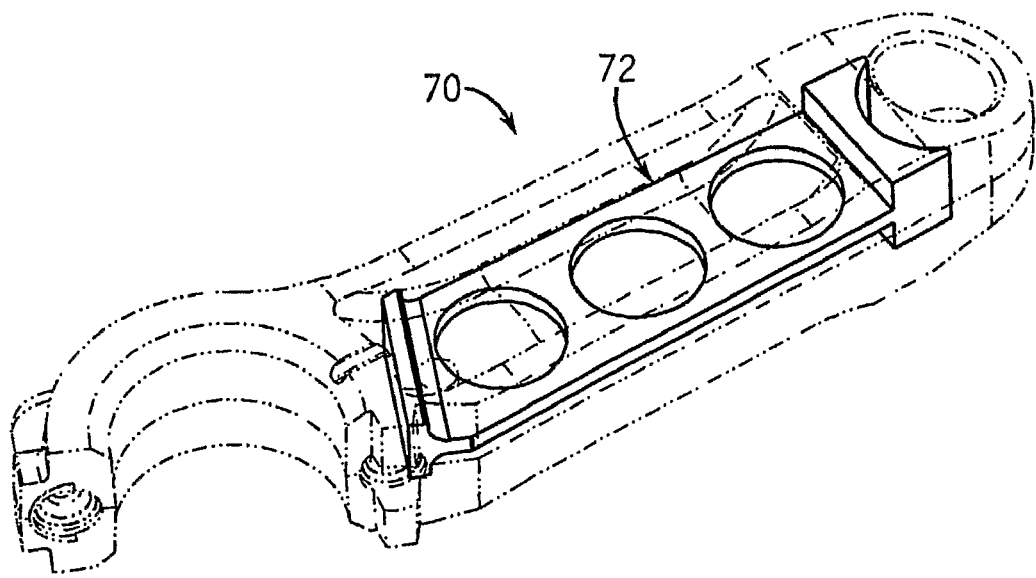
FIG. 4 is a perspective view of a connecting rod like FIG. 1 but of a second embodiment.
Figure 5:
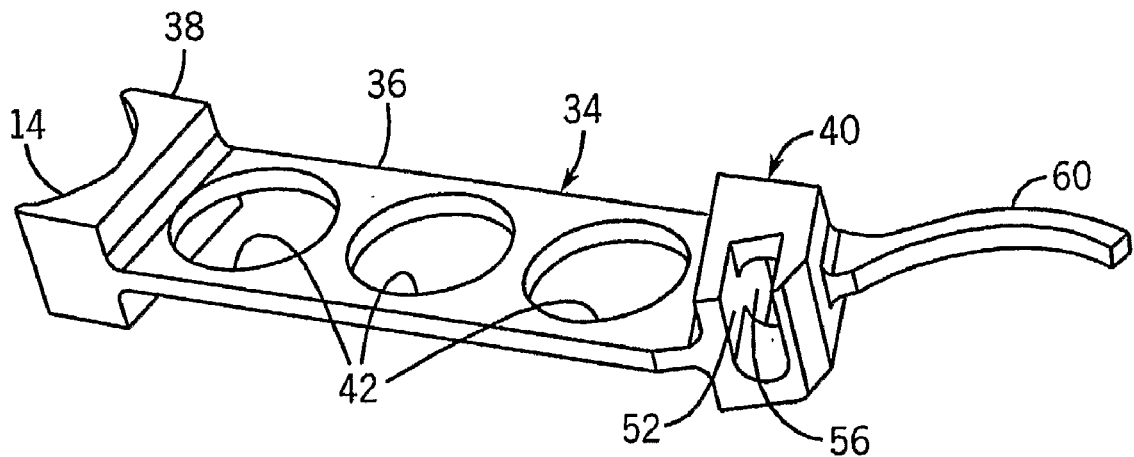
FIG. 5 is a perspective view of the insert of FIGS. 1-3 alone.
Figure 6:
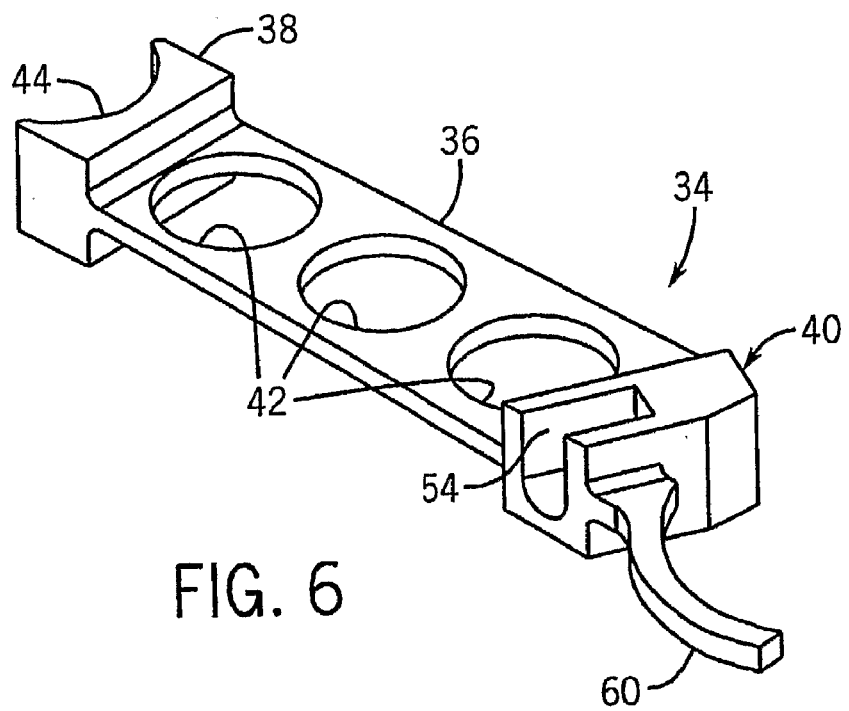
FIG. 6 is a perspective view of the insert like FIG. 5 from a different angle.
Figure 7:
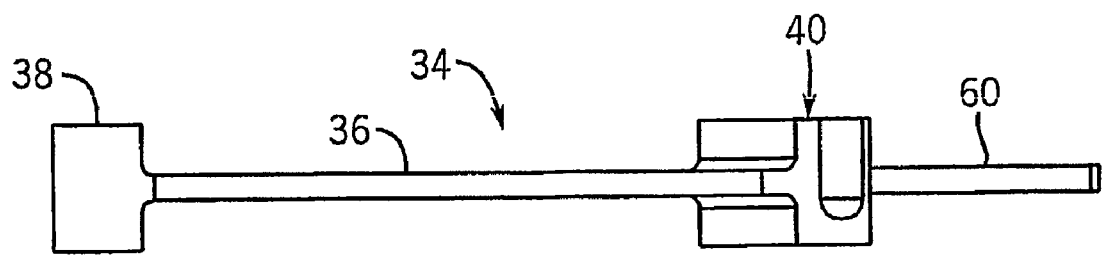
FIG. 7 is a side plan view of the insert of FIG. 5.
Figure 8:
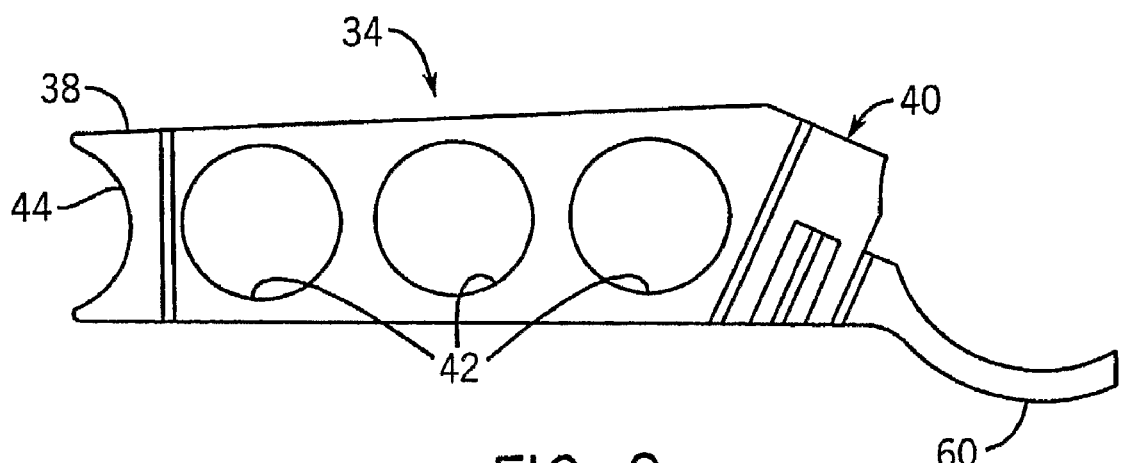
FIG. 8 is a front plan view of the insert of FIG. 5.
Figure 9:
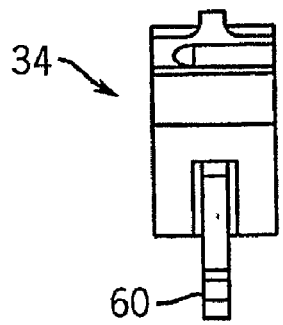
FIG. 9 is an end plan view of the insert of FIG. 5.

FIG. 4 illustrates an alternate embodiment of a connecting rod 70 which is the same as the connecting rod 10 except for the insert 72. The insert 72 is the same as the insert 34, except that the insert 72 does not have the end 40. If in a given application the connecting rod is known to be stressed mainly in the beam section, reinforcing the end 40 may not be necessary, and so the insert 72 could be applied.

A connecting rod and insert of the invention have been described in considerable detail. Many modifications and variations to the preferred embodiments described will be apparent to persons of ordinary skill in the art. For example, different powder metal materials could be used for the beam section or for the end sections of the insert, and the end sections themselves could be of different materials. Also, there could be any number of different sections, for example perhaps the center beam section could itself have sections of different materials. In addition, the part could be sintered powder metal (P/M) material or powder forged (P/F) material, and as used herein the term "powder metal" or "sintered powder metal" includes powder metal material whether it is forged or not (for example if it was only sintered). Further, the beam section could be made of an air hardening powder metal material, or not, and the end sections could be of non-air hardening powder metal material, or not. Therefore, the invention should not be limited to the preferred embodiment described, but should be defined by the claims which follow.

INDUSTRIAL APPLICABILITY

The invention provides a connecting rod of the type used in a reciprocating piston engine.

What is claimed is:

1. A connecting rod comprising:
   a beam section between two end sections, the beam section and the two end sections being integral with one another and the beam section and the two end sections being at least partially made of a cast metal material,
   wherein at least the beam section includes an insert made of a sintered powder metal material, the insert being at least partially encapsulated by the cast metal material and wherein at least one of the ends of the insert has at least one slot formed therein which receives the cast metal material, the cast metal material in the at least one slot configured to be machined for forming a bolt hole configured to connect a bearing cap.

2. The connecting rod of claim 1, wherein the cast metal material is an aluminum alloy.

3. The connecting rod of claim 1, wherein the insert has pores and the cast metal material at least partially permeates the pores of the insert.

4. The connecting rod of claim 1, wherein the sintered powder metal material of the insert comprises iron powder.

5. The connecting rod of claim 1, wherein the insert has a perforated beam section including at least one hole.

6. The connecting rod of claim 1, wherein the insert has a finger that extends into one of the end sections of the connecting rod.

7. The connecting rod of claim 1, wherein the insert at least partially surrounds a hole in one of the end sections in the connecting rod.

8. The connecting rod of claim 1, wherein one of the end sections in the connecting rod is dimensioned to be secured to a piston, and the insert has a widened section at the end section that is dimensioned to be secured to the piston.

9. The connecting rod of claim 1, wherein one of the end sections in the connecting rod is dimensioned to be secured to a crankshaft, and the insert has a widened section at the end section that is dimensioned to be secured to the crankshaft.

10. The connecting rod of claim 1, wherein at least one of the ends of the insert has two slots formed therein, in which the two slots are opposed to one another, open to different sides of the end, and intersect in the middle of the end at which location there is an absence of material to create a through hole in the insert.

11. The connecting rod of claim 1, further comprising the bolt hole and wherein a thickness of the cast metal material is located between the bolt hole and the at least one slot.

12. A method for forming a cast connecting rod having a beam section between two end sections, the beam section and the two end sections being integral with one another, the method comprising:

placing a sintered powder metal insert in a mold, the sintered powder metal insert having at least one slot formed on at least one end thereof; and introducing molten metal material into the mold such that at least the beam section of the cast connecting rod comprises the insert partially encapsulated by cast metal material and the cast metal material is received into the at least one slot;

wherein the cast metal material in the at least one slot is configured to be machined for forming a bolt hole configured to connect a bearing cap.

13. The method of claim 12 wherein:
the metal material is an aluminum alloy.

14. The method of claim 12 wherein:
the sintered powder metal insert comprises iron.

15. The method of claim 12 wherein:
the sintered powder metal insert is formed to include pores, and
the molten metal material at least partially permeates the pores of the insert.

16. The method of claim 12 wherein:
the insert is formed to have a finger, and
the insert is placed in the mold such that the finger extends into one of the end sections of the cast connecting rod.

17. The method of claim 12 wherein:
the insert is placed in the mold such that the insert at least partially surrounds a hole in one of the end sections in the cast connecting rod.

18. The method of claim 12, further comprising the step of drilling at least one bolt hole into the cast metal material filling at least one slot of the insert.

\* \* \* \* \*

UNITED STATES PATENT AND TRADEMARK OFFICE
CERTIFICATE OF CORRECTION

PATENT NO.         : 8,336,425 B2
APPLICATION NO.    : 11/995770
DATED              : December 25, 2012
INVENTOR(S)        : Mandel et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1109 days.

Signed and Sealed this
Twenty-sixth Day of August, 2014

Michelle K. Lee
*Deputy Director of the United States Patent and Trademark Office*